Inventors:
James H. Starr,
Robert A. Clark, Jr., and
Millard C. Westrate.
by [signature] Atty.

GENERATING STATION INCREMENTAL COST COMPUTERS, AND THE LIKE

Filed June 13, 1955 2 Sheets-Sheet 2

Inventors:
Robert A. Clark, Jr.;
James H. Starr &
Millard C. Westrate,
by [signature] Atty.

2,841,331

GENERATING STATION INCREMENTAL COST COMPUTERS, AND THE LIKE

James H. Starr, La Grange, and Robert A. Clark, Jr., River Forest, Ill., and Millard C. Westrate, Jackson, Mich.

Application June 13, 1955, Serial No. 515,162

17 Claims. (Cl. 235—61)

This invention concerns itself with improvements in generating station incremental cost computers, and the like. The incremental cost of a power generating unit varies with the output of such unit, and such incremental cost may be shown by an incremental cost curve relating incremental cost rate to output of the generating unit over the permissible range of loadings of such unit. It has been shown that when a number of power generating units contribute to supply a total power requirement the most economical division of such total power requirement between such contributing units is that division under which the incremental costs of all of the units are equal for the powers to be supplied by such units. If the total power requirement is that power to be delivered by a power station having a number of generating units then the division of such total generating station power among the units of such station in service at any given time should be that division under which the incremental costs of such several generating units in service are the same. If the total power requirement is that power which is to be delivered by a network to a number of loads connected to the network at different points, which network is fed by power from a number of generating stations, then the incremental costs of all such generating stations should be the same, by proper division of total power requirements between all such stations, taking proper account of the network losses and the portion of such losses which must be carried by each generating station as a part of the load on such station.

It thus becomes important to have available accurate and reliable data as to the true incremental rate for each generating station, over the range of power supplied by such station, and such data must be based on presently existing operating costs and plant conditions. Such data should take into account the incremental rates of the several power generating units of such station in use at the time. Having in hand data or curves showing the incremental rate of each generating station, or the incremental rate for each unit of such sation, for various power outputs within the acceptable power range of such station or unit, the operator is able to determine the optimum division of total power requirements between the various contributors to such total. He may determine such division of power on the basis of experience; or he may feed the information so gained into a calculating table by which further determinations are made which take into proper account network losses and other factors which influence the determination of the complete solution of the problem of division of total power requirements between a number of contributors to such network.

The present invention concerns itself with the provision of an incremental cost computer by which the incremental cost of a generating station may be determined within a very small error, very quickly, and on the basis of presently existing operating costs and conditions of the plant's elements. Broadly stated, the prime object of the present invention is to provide a continuous or rapidy produced indication of the corrected incremental cost of each generating unit based on presently existing fuel costs and operating conditions. Such information may then be used as a basis for despatch of power into the network, or for other purposes.

More specifically the present disclosures are directed to provision of means to give a continuous indication of incremental cost for each station or for each unit within a station under the then existing internal station conditions, including correction not only for cost of fuel in cents per M B. t. u., but also including correction for substantially all factors which materially affect the losses incident to conversion from chemical to electrical energy, and the amount of heat rejected to the cooling water for the condensers. Such indicated station incremental cost does not include any adjustment or correction for incremental transmission losses since the load or power supplied by each contributing station must include the portion of the total network losses which should be carried by such station at the load division finally determined as being the most economical, and thus becomes a portion of the load actually carried by such contributing station. The means whereby the station incremental costs for the various contributors to the total requirements of a given network and its loads, may be used and coordinated to determine the optimum division of total power requirements, taking proper account of the effects of network losses, is disclosed elsewhere. The generating station incremental cost data or indications obtained by use of cost computers to which the present invention relates may be fed as input data to the means or devices which are used to determine the optimum division of the total power requirements, as well as for making studies and decisions for other purposes.

The following statement will outline various underlying principles affecting incremental cost rates of the generating station and/or its units, and the determination of such incremental rates:

An electric power company buys energy in the form of fuel and sells energy in electrical form. The lower the cost of fuel for a given hour of operation, the greater the operating profit. The conversion of the energy in the fuel into electrical form is accompanied by the loss of energy through inefficiencies in the conversion equipment and rejection of energy in accordance with established thermodynamic principles. The anticipated losses in conversion and through rejection are computed at the time the plant is constructed and these computations are confirmed by acceptance tests. From these computations and tests, curves are prepared showing the fuel input corresponding to each value of electrical output over the range of operation contemplated. These curves may be corrected from time to time as subsequent test data become available although no attempt is normally undertaken to make such corrections on an hour to hour, or day to day basis. Having such fuel input-power output curves for each contributor to the network, and knowing the cost of fuel at each power contributor, the curves may be re-plotted or corrected, or a correction factor may be introduced into the data, to show actual present variation of total cost of fuel per hour against total power contributed by the generating station. Incremental cost curves which are first derivatives of the foregoing curves, may then be plotted showing actual present values and variations of incremental cost of each contributing station with variation of power contributed by such station.

Present layouts and installations of large generating stations include steam generating equipment and needed auxiliaries, which are individual to the corresponding generators. Any cross-connections which are provided between the steam generating and carrying equipments of the various plant sections are normally closed and are used for emergency operations only. Consequently the entire generating station is usually operated as a number of distinct sections, each section being individualized from the point of fuel supply to the electrical power connections to the power delivery busbars, or to the points of connection to the network. On such a basis of operation the determination of the actual present incremental cost rate for each plant section, or the correction factor to be applied to incremental cost rate curves based on previous tests such as acceptance tests, is much simplified. We shall therefore consider the application of the features of our present invention as so applied to a single plant section to determine the actual present incremental cost rate curve, or the correction factors to be applied to previously obtained empirical curves.

Having obtained such presently accurate curves the total loading being carried by the station should be divided between the two or more plant sections on such a ratio that they all operate at loads such that their incremental cost rates are equal. Furthermore, when such division of total plant power output between its sections has been determined, the incremental cost rate of such plant as a whole will be that incremental cost rate at which the cost rates of the several plant sections are also equal to each other.

Consider a steam-electric generating station unit comprising a single turbine driven electric generator with a single boiler and related equipment. During the design and installation period a heat balance diagram is constructed based on manufacturer's data and computations which corresponds to the most economical operation of such combined plant. This diagram is normally based on those values of throttle temperature and pressure for which the turbine was designed, and on the exhaust pressure on which such design was based. From this heat balance, sometimes after confirmation by tests, is constructed a fuel input vs. power output curve, and by application of the proper fuel cost rate, the curve may be fuel input cost vs. power output. The derivative of this curve with respect to power output is the incremental power cost vs. output curve. The fuel input vs. power output curve is normally either a straight line or slightly concave upward, with a positive intercept at zero power output. Frequently the curve will have one or more points of discontinuity depending on the type of governing employed. The incremental fuel cost vs. power output curve will be somewhat similar in shape, and may be represented by a series of straight line segments, each of suitable slope and intercept.

As disclosed in the co-pending application of the undersigned, James H. Starr and Robert A. Clark, Jr., Serial No. 483,452, filed January 21, 1955, for "Calculating Table, and the Like," a voltage may be developed which is proportional to incremental fuel cost by passing a current proportional to power output through a resistor of appropriate value in series with a fixed voltage. The slope of the voltage-current relation is determined by the value of the resistor, and the intercept is equal to the value of the series fixed voltage. By selection of the proper resistance and fixed voltage values the correct relationship may be produced so that the values of the incremental fuel rates corresponding to changing power values may be simulated; and by application of a proper correction factor, such voltage indication may be used to simulate the incremental fuel cost rate. If, due to discontinuities in the form of the incremental cost curve, there are a series of line segments required for correct simulation of the incremental cost rate over the desired range of power output values, the appropriate resistance and series voltage values are inserted through the operation of microswitches actuated by servo-type instrument responding to net power output of the unit in question. The selection of the values of the resistors and of the fixed voltages used in the foregoing arrangement is of course dependent on the shape and actual values indicated by the curve which such arrangement simulates. Accordingly, such arrangement may be arranged to simulate either the incremental cost curve based on the designs of the unit, or on acceptance or other tests. If the operating conditions change, or if the fuel cost changes, or if other significant conditions affecting the form or absolute values of the incremental cost rate curve change, it is evident that provisions must be made to effect corrections or introduce correction factors which will result in bringing the form and values of the curve into harmony with the actualities then existing.

Before proceeding to an explanation of the means which we have herein disclosed for effecting corrections to the incremental cost rate curve for the unit in question, the following further explorations are in order:

Each line segment of the curve relating fuel cost to output may be represented by an expression in the form (1) $\$/\text{hr.}=C(a+bP+cP^2)$, where
$C$=cost of fuel in cents per B. t. u.;
$P$=net power output; and
$a$, $b$ and $c$=appropriate coefficients.

Then the corresponding line segment in the incremental fuel cost vs. output curve is $$d(\$/\text{hr.})/dP=C(b+2cP) \qquad (2)$$

Since the foregoing relationships have been based on the incremental cost curve without corrections for presently existing departures from the conditions of operation and plant condition on which such curve was predicated it now remains to examine the conditions which affect the present values of that curve, and to show how corrections may be made which will produce incremental cost values based on the present conditions.

The plant operating conditions are not constant throughout the normal year of operation. Changes in fuel analysis and water content, air temperature, and quantity, barometric pressure, cooling water temperature, condition of the furnace, boiler, turbine, condenser, or auxiliary equipment may occur from day to day or hour to hour which more or less materially affect the amount of heat released in the furnace to produce one unit of net power at the buses. The effects of such changes on the incremental cost of power must therefore be explored.

First, a test may be applied to determine whether or not the incremental cost curve as originally determined and plotted represents, at the present time, the actual present incremental cost rate. This will indicate the need or otherwise of application of a correction. Let it be assumed that the fuel cost vs. output, and the incremental fuel cost vs. output curves had been correctly plotted for the operating conditions for which the equipment was designed. Let it also be assumed that instruments are provided which continuously indicate the present rate of fuel consumption expressed in \$/hr., and the net power output, after subtracting any auxiliary power use, in kw. Then, at any instant these two readings provide the coordinates of a single point which may be plotted on the fuel cost vs. output curve. If all plant conditions are identical with those assumed in the computation of this curve, the point will lie on the curve; otherwise it probably will not. The fact that the point does lie on the curve is conclusive evidence that the original curve is still a correct representation of the present operating conditions. From this it may be assumed that the original incremental cost vs. output curve is also presently accurate.

Next we consider in what manner the curve of incremental fuel cost vs. output will be altered if the point mentioned in the preceding paragraph does not lie on the curve which was plotted for the operating conditions for which the equipment was designed. It is correct to state that each dollar of fuel burned releases a definite amount of heat in B. t. u., and further that of this amount of heat released, a definite fraction appears as net energy at the busbars available for sale. If the factor C in the preceding Equations 1 and 2 shall be re-defined, not as cents per B. t. u. total heat content of the fuel, but rather as cents per B. t. u. net available energy content of the fuel, as hereinafter discussed, then the preceding equations provide a simple answer to the question of how the curve of incremental fuel cost vs. output should be altered to correctly show the incremental cost on the basis of presently existing operating conditions. Following out this analysis the reasoning below applies:

Consider that the dollars fuel input vs. kilowatts salable power output curve indicates that with an output $P_1$ the cost of fuel per hour is $R_1$ and the incremental fuel cost curve for that same output, $P_1$ indicates that the incremental fuel cost is $S_1$, and at a specific time the fuel cost meter indicates the cost of fuel, not as $R_1$ but as $R'_1$ at an output $P_1$, then the incremental cost is not $S_1$ but $S'_1$, so that (3) $$S'_1=S_1(R'_1/R_1)$$

This simple equation is valid only if the coefficients *a*, *b* and *c* in Equations 1 and 2 remain constant, that is, these coefficients are the same at the present time as they were at the time of the acceptance tests or are the same as they were assumed to be when the incremental cost curve or the fuel input vs. power output curve was calculated and plotted from the design characteristics referred to earlier herein. As a matter of fact these coefficients probably do not remain constant or are not the same under the conditions then and now existing. However, the variation is slight in comparison with the quantity C as re-defined above. To illustrate this fact consider the following:

Make the assumption that all conditions remain just as they were assumed to be in making the original computation of the input fuel cost vs. output and incremental fuel cost vs. output curves, except that there is a substantial increase in the moisture associated with each dollar cost of the fuel. This moisture is vaporized in the furnace, and the latent heat of vaporization is no longer available to heat the fluid within the boiler. As re-defined C is the cost of the net available heat in the fuel, and as there is less net available heat due to the necessity for using part of the gross heat to vaporize the water, the value of C increases; that is to say, there are now more cents per net B. t. u. input. The ratio between the original and the present value of C is established by the ratio between the ideal and the actual present rate of fuel feed, the former being known from the original curve and the latter from the fuel rate meter, hereinafter to be referred to. There is no apparent variation in the coefficients *a*, *b* or *c*. Actually, there must be more pounds of fuel fed to the furnace to maintain the same output after the water content is increased, and these added pounds require more air for combustion, burning to more gaseous products. These greater volume gaseous products must move at higher velocity through the boiler. Therefore they are in contact with the boiler surfaces for a reduced interval. This means that less of the heat contained in these gases is absorbed by the boiler and that therefore some or all of the coefficients *a*, *b* and *c* do actually change. However, the actual change in velocity is slight and the effect on the efficiency of heat transfer is also slight.

The error ensuing from the assumption that the coefficients remain constant is insignificant in comparison with the error which would result from assuming that the water in the fuel had no effect on the incremental cost.

Similar reasoning may be applied to a very large number of variable factors which affect the overall heat rate of a steam-electric generating unit. In some instances the reasoning is less justified than in others but in all cases the error resulting from the implied assumption that the coefficients *a*, *b* and *c* remain substantially constant, and that only C varies is acceptably small in contrast to the conventional presently accepted assumption that incremental cost is always that indicated by the incremental cost vs. output curve calculated on the basis of idealized operating conditions. One example to sustain this proposition is the following:

If the cooling water is warmer than required for the nominal back pressure for which the turbine is designed, the exhaust pressure is higher and there is less energy available for conversion into mechanical form (and thence to electrical energy). In this case the assumption that incremental rate varies in direct proportion to fuel input is substantially correct. But if the cooling water is at a lower temperature than the standard condition the back pressure is lower and the steam is expanded to a greater volume than the final stage blading is designed to handle efficiently at rated load. The efficiency drops rather sharply under this condition and the incremental rate found by multiplying the nominal incremental rate (that assumed from the acceptance tests or from the data previously referred to) by the fuel input ratio is over-optimistic. Even so, the error introduced by the assumption that the incremental rate varies in direct proportion to fuel input is small when compared to the error prevailing when no correction factor is applied as is the conventional presently accepted practice.

Considered fundamentally, our invention comprises the provision of means to determine the present incremental cost rate of energy now being delivered by the generating unit at the output now being supplied by such generating unit, by determining a correction factor to be applied to the "ideal" incremental rate at such output, such "ideal" incremental rate being based on design calculations, or on acceptance or other tests, such correction factor being applied to said ideal incremental cost rate for such output. More specifically, our invention includes the provision, with such ratio determining means, of further means to apply such ratio to said ideal incremental cost rate at such output.

In carrying into practice our invention we provide the following elements of equipment, or equivalent elements and functions thereof:

First: A fuel metering unit which measures the fuel input to the furnaces of furnaces and furnace equipment, which supply steam to the generating unit in question. Such fuel metering equipment may be either a continuous indicating unit showing or indicating continuously an indication based on rate of fuel consumption; or it may be an instrument giving its indications as average rates based on short time intervals of operation. The indications of such fuel metering equipment may be given directly in B. t. u./hr., since the incremental cost rate is directly influenced by the total B. t. u. input, all of which input including all losses, must be paid for. Since the rate of B. t. u. input depends on the actual rate of fuel input multiplied by the B. t. u. content of the fuel per unit volume or per unit weight, provision is made, either in the B. t. u. meter, or by a proper correction factor applied to the weight or volume rate, for causing the meter indication to be given in B. t. u./hr. The metering equipment must of course be of type suitable for the kind of fuel being used, whether gas, liquid, or solid. We shall speak further of this B. t. u. metering equipment hereinafter. Conveniently, also provision is made for giving the B. t. u./hr. meter indication as a D. C. potential whose value is proportional to such B. t. u./hr. indication. The reasons for this preference will appear hereinafter.

Second: We also provide means to continuously meter the net power output of the generating equipment in question. Conveniently this means may comprise a Thermoverter of the type put out by The Bristol Company of Waterbury, Connecticut, and known as "Thermoverter, Model W–878," and disclosed in Letter's Patent of the United States, Nos. 1,407,147 and 1,456,591. Such devices are also described in Sales Data Sheet, No. 220, of said Briston Company, dated March 1, 1940. We do not, however, intend to limit ourselves to such metering devices; but they are well adapted to use in connection with other elements of equipment hereinafter referred to. This is because, among other things, such Bristol devices deliver a D. C. potential proportional to the power being measured, and with a very small time lag of the indications, as values of power change.

Third: We also provide means to give an indication proportional to the B. t. u./hr. input at the net power output now being delivered by the generating unit, but under the ideal conditions which we have previously referred to. Those are the design characteristics of the plant, or the calculated results of the acceptance or other tests. Conveniently, this third means takes the form of a biased potentiometer which will deliver a D. C. potential proportional to the B. t. u./hr. fuel input required by the generating unit under the design conditions, or the acceptance or other tests, and normally used in plotting the heat-input vs. power-output curve previously referred to.

Fourth: We provide means to give an indication of the incremental heat rate at the presently existing output of the generating unit when operating under the ideal conditions previously referred to, being the design characteristics of the equipment, or the results of the acceptance or other tests. This means conveniently includes a group of series-connected, voltage-resistor elements which may be used to produce values of voltage drop proportional to the incremental heat rate at the now existing output but when operating under the ideal conditions. Since by such means the incremental heat rate may be indicated by such potential this type of unit is well adapted for use in connection with the elements of "means" previously mentioned, as well as other such elements of "means." This fourth means thus delivers a potential which is proportional to the incremental heat rate at the presently existing generating unit output and under the ideal conditions previously referred to. The indication corresponding to this potential must then be corrected by a ratio which is found by comparing the B. t. u./hr. at the presently existing generating output, under presently existing conditions, with the B. t. u./hr. at the presently existing output, but under the ideal conditions.

Fifth: We also provide means controlled by the presently existing net power output to shift the third means to a position corresponding to the presently existing net power output so that third means shall deliver its D. C. potential in amount controlled by the presently existing net power output. Thus the D. C. potential delivered by said third means shall represent the "ideal" heat rate at the value of net power output presently existing. This fifth means also adjusts an A. C. potential to a value which is proportional to the net power output presently existing, which A. C. potential is used in the operation of the fourth means. This fifth means also adjusts the group of series-connected voltage-resistor elements of the fourth means to a condition corresponding to the presently existing net power output so that the voltage drop across said voltage-resistor elements shall represent the incremental heat rate of the generating unit at the net power output now existing, but for the ideal conditions, already referred to. This adjustment conveniently takes the form of selection of that voltage-resistor element which will produce a voltage drop proportional to the incremental heat rate at the presently existing output of the generating unit when operating under the ideal conditions. This fifth means conveniently takes the form of a servo-motor driven element which is moved to a position corresponding to the net power output of the generating unit. Such fifth means may conveniently include an instrument of the type of the "Moseley D. C. voltmeter, Model 20 Series," produced by the F. L. Moseley Co., of Pasadena, California, and described in Bulletin No. 7 of that company, and dated March 1954. It conveniently makes its setting by comparison of the D. C. potential delivered by the Thermoverter of the second means with a D. C. reference voltage.

Sixth: We also provide means controlled by the A. C. potential which is adjusted by the fifth means to a value proportional to the net power output presently existing, to adjust the current in the fourth means and flowing through the series-connected voltage-resistor elements of the fourth means, as selected by the fifth means, to a value proportional to the net power output of the generating unit. Thus the fourth means is brought to a condition such that the potential across the so-selected series-connected voltage-resistor element shall represent the incremental heat rate under the ideal conditions and for the generating unit output presently existing. This sixth means also conveniently takes the form of a motor driven element in an instrument of said Moseley D. C. voltmeter type. It conveniently takes its setting by comparison of the drop of potential across a fixed resistor through which flows the current of the selected series-connected voltage-resistor element, with the A. C. potential which represents the presently existing output of the generating unit, as adjusted by the fifth means.

Seventh: We also provide means to compare the actual presently metered heat rate in B. t. u./hr. input, for the presently being delivered power output (the first means), with the "ideal" heat rate in B. t. u./hr. for the presently being delivered power output (the third means), and to produce an adjustment of a variable ratio element to a value which equals the ratio of the "ideal" heat rate in B. t. u./hr. as calculated from the designs or determined from the acceptance tests, at the present output, compared to the present heat rate in B. t. u./hr. for the present output. This seventh means also conveniently takes the form of a servo-motor driven element moved to a position in which a condition of balance is produced based on the presently existing value of such ratio. Such servo-motor driven element comprises a portion of an instrument of the Moseley type previously referred to. Such servo-driven element unit conveniently makes its finding of ratio by comparison of the voltage representing the "ideal" condition with the voltage representing presently existing heat rate, both on the basis of the presently existing net power output of the generating unit.

Eighth: We also provide means which applies the correction ratio determined by the seventh means, to the finding of the incremental heat rate under the ideal conditions, for the presently existing generating unit output, as represented by an A. C. potential, to produce another A. C. potential. Such other A. C. potential is then proportional to the incremental heat rate for the presently existing generating unit output, and under the presently existing B. t. u./hr. as determined by the first means. This application of said ratio to the ideal incremental heat rate is conveniently produced by varying the ratio of the primary and secondary windings of a transformer, such variation being effected by the movement of the motor driven element of the seventh means, above referred to.

Ninth: We also provide means to apply to the "corrected" incremental heat rate, as indicated by the eighth means, a multiplying factor based on the presently existing cost of the fuel used in dollars/B. t. u. This multiplying factor conveniently takes the form of a variable ratio transformer which may be manually or otherwise set to position corresponding to the present cost of the heat in dollars per unit B. t. u., or in other selected measure of costs.

We do not intend to limit ourselves to specific forms of the various elements of "means" referred to above, but we contemplate the use of any element of equipment capable of producing the operation defined as being produced by such element of "means," except as we may limit ourselves in the claims to follow. However, the following further comments respecting the form and characteristics of the "first means" are here in order:

As an example of a fuel metering unit for use in the first means when the fuel is a gas, the so-called Linderman type meter may be used with pointer position automatically corrected for actual pressure and temperature. This pointer may then be connected to the slider of a potentiometer in such way that such slider assumes a position to include a fraction of the whole potentiometer resistance proportional to the rate of gas flow. A manually adjustable element may be provided to adjust a voltage to an amount proportional to the heat content of the gas in B. t. u. per standard cubic foot, and this so-adjusted voltage may be impressed across the complete potentiometer. Under these conditions the voltage across the part of the resistance will be proportional to the B. t. u./hr. consumption. Such an arrangement is illustrated hereinafter.

If the fuel is a liquid a suitable meter may be inserted in the fuel supply line at a point where it will meter the fuel actually delivered to the furnaces. A Connersville type meter measures the volume by revolutions of a shaft, and the rate of fuel feed by rate of such shaft rotations. Any small inaccuracy in the metering of this unit can be disregarded since the rate of fuel supply as metered by this unit is used in establishing a ratio between actual and ideal fuel consumption values or B. t. u. rates based thereon. Rather slow rotational speeds of the meter's shaft may be converted into proportional voltage values in conventional manner. One method to do this consists in providing means to cause the shaft rotation to produce a specific number of electrical contacts (per revolution), and providing means to count the number of contacts in a stated time interval, say one minute. Such counting may be done by use of a three electrode vacuum tube which is normally biased to cut-off, applying the pulses produced by the contacts to the grid of the tube. At each such pulse the tube becomes conducting for a very short interval of time, and at each such short conducting interval the tube passes a short charging pulse of current from a source of fixed potential to a condenser. The condenser charge is allowed to leak off at a known rate over a bleeder resistor. The average voltage remaining on the condenser at conclusion of the stated time interval will be proportional to the number of pulses delivered by the meter shaft rotations, and thus also proportional to the liquid flow in G. P. M. By manually adjusting the potential of the fixed source of potential proportional to the B. t. u. per gallon of liquid, the average condenser potential becomes proportional to the B. t. u. per minute or hour heating value of the fuel metered.

If the fuel is powdered coal the rate of flow to the burner may be metered by an impeller located in the pipe conveying the coal to the burners. The conversion of the rate of rotation of the impeller shaft to B. t. u./hr. may be produced by an arrangement similar to that stated above with respect to the metering of liquid fuel.

Such arrangements as those above briefly described for the metering of both liquid and powdered fuel are illustrated hereinafter. We have thus briefly described and shall illustrate such metering arrangements for the fuel input only by way of illustration, and without any intention of limiting the features of our present invention thereto, except as we may so limit ourselves in the claims to follow.

It is here noted that under conventional generating station practice the control of the rate of fuel flow to the burners is effected by the load being carried by the generator equipment corresponding thereto. It is well recognized that a great deal of heat is stored in the furnace walls and proximate structural elements. During an extended interval when the load is substantially constant these walls and structural elements attain a steady temperature condition, with storage of a corresponding amount of heat in B. t. u. When the load changes, for example, when it drops, the rate of fuel flow is automatically reduced to a value less than that needed to sustain the required heat supply for such reduced load; and such reduced rate of fuel supply or feed is continued for an interval during which the deficiency in rate of B. t. u. supplied by the incoming fuel is made up by reduction of the temperature of the furnace walls and proximate structural elements, such reduction in temperature being accompanied, of course by surrender of B. t. u. to the water contained in the boiler, principally. After such interval of too great a reduction in rate of fuel feed, said rate is raised to that value which will meet the steady requirements imposed by the reduced load demand. This assumes that there has been no further change in the load demand during such interval of attaining a new condition of balance.

It is accordingly evident that if the elements of the present invention, and the meter or indicator by which the corrected incremental heat rate or the corrected cost per hour is one which immediately responds to changes based on the instantaneous changes in rate of fuel feed, such indicating meter will give incorrect indications during intervals when the rate of fuel feed is being changed, and for intervals of rather indefinite duration thereafter, and until the new condition of balance has been attained. In many cases such intervals needed to regain a condition of balance are small, and when a meter is provided which immediately responds to all changes is used, its indications may be disregarded during such transition intervals.

When the meter which indicates the actual incremental heat rate is a graphic or recording instrument, it is evident that changes in such rate as indicated on the chart of such an instrument will be in the form of slanting portions of the graph connecting substantially straight graph portions corresponding to steady conditions of operation. The rate of change of fuel feed will then be reflected in the steepness of slant of such connecting portions of such a graph. It will also be seen that when the rate of change of fuel feed is small corresponding to a gradual change in the net power output, the slanting portions of the graph will correctly reflect the incremental heat rates over the interval of such change. If, however, the rate of change of output and corresponding rate of change of fuel feed is too great for a correct instantaneous indication of the incremental heat rate, such fact will be evidenced by a slant of the graph which is steeper than a prescribed degree of slant; and such too steep slanting portions of the graph may be disregarded.

Alternatively, we contemplate the provision at a suitable portion of the equipment, as for example, between the ninth means of the indicating meter which shows the incremental cost rate based on the incremental heat rate, of a suitable form of integrating circuit so that the final or indicating meter or instrument will give its indication on the average incremental rate for, say, the last minute or the last five minutes. We contemplate the provision of such means in connection with the equipment hereinbefore briefly described.

In the drawings:

Figure 1 shows more or less schematically, and by a simple circuit diagram, a combination of the elements previously defined as the first to the ninth means, the several elements comprising the several "means" being legended to correspond to the numerical titles previously assigned to them; and in this figure the elements "fifth means," "sixth means" and "seventh means" are shown as having their respective servomotors connected to the elements of the "means" which they adjust, such showings being by the broken lines;

Figure 1:
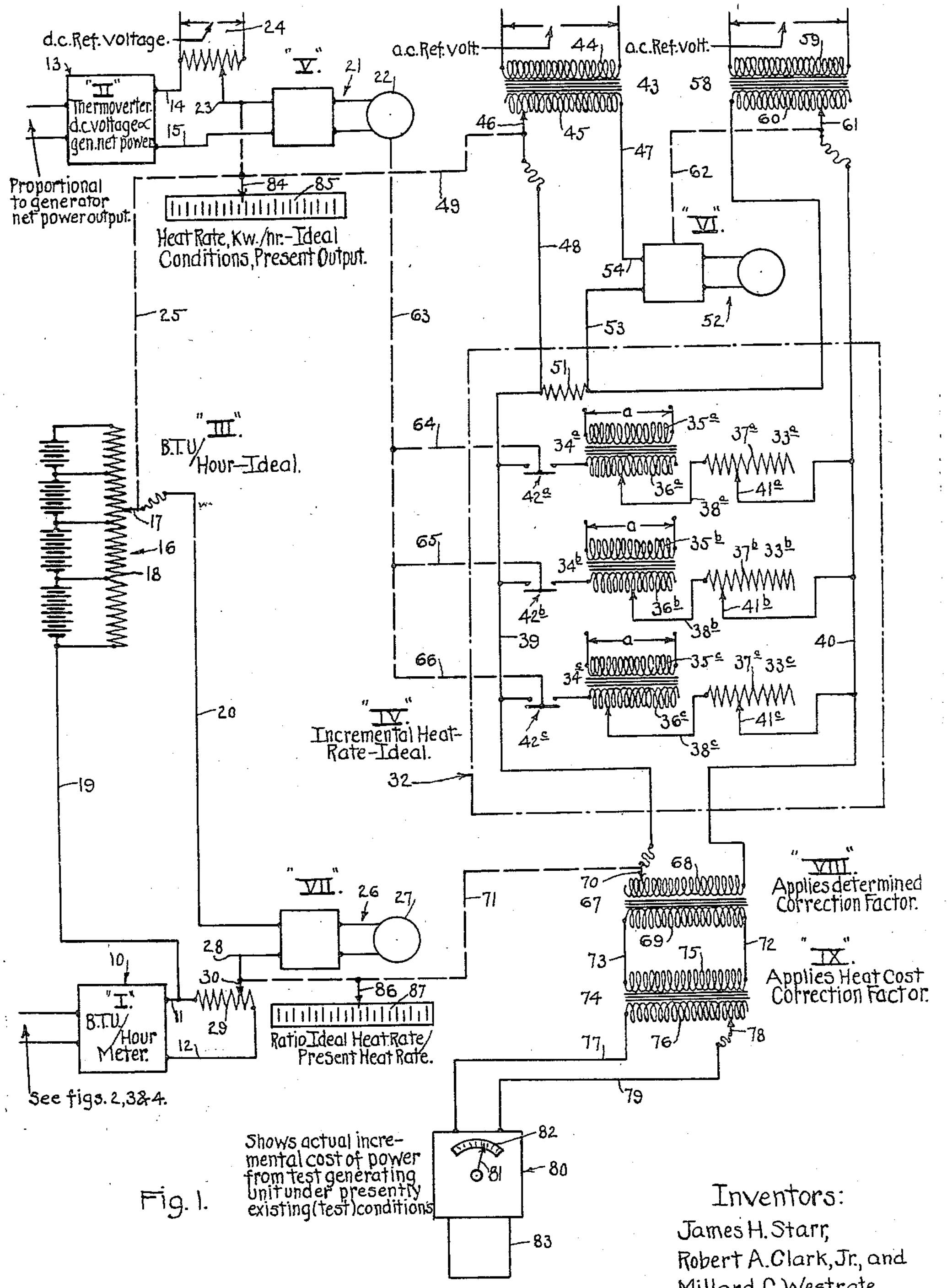

In Figure 1 the first means is shown at 10, and the terminals between which a voltage is delivered as a D. C. potential proportional to the B. t. u./hr. are shown at 11 and 12. The second means is shown at 13, and the terminals between which a voltage is delivered as a D. C. potential proportional to the net power output are shown at 14 and 15. These function to deliver their indications on the basis of presently existing performance. The third means is shown at 16. This unit comprises a biased potentiometer whose resistance element, and D. C. current connections are so arranged that as the sliding contact 17 is shifted over the resistance element 18 to different positions the potential between the terminals 19 and 20 is proportional to the B. t. u./hr. input under the ideal conditions, for each adjusted position of such sliding contact. It will be presently shown that such sliding contact is caused to assume positions corresponding to various net outputs as measured by the second means, 13; and the arrangement of this potentiometer of the third means, 16, is such that for each such position of the sliding contact 17, the potential delivered between the lines 19 and 20 is a true representation of the B. t. u./hr. input under the ideal conditions, and for the same net power output as corresponds to such position of the sliding contact. Under the foregoing conditions and specifications it is evident that, since both of the potentials, that between the lines 11 and 12, and that between the lines 19 and 20, represent B. t. u./hr. conditions for the same net power output (the potential 11—12 corresponding to presently existing conditions, and the potential 19—20 corresponding to the ideal conditions), these two potentials may be compared and a ratio established which may be called the "correction ratio" or factor, to be applied to the ideal incremental heat rate corresponding to that net power output in order to determine the corrected or presently existing incremental heat rate of that net power output. We shall presently disclose how this comparison is automatically effected, and the desired ratio determined, and how that so-determined ratio is then automatically applied to other units of the ensemble to produce the desired end result.

The fifth means is shown at 21. It conveniently comprises such a device as the Moseley unit already referred to, and includes the servo-motor element 22 which drives the follower 23 to a position such that the potential between the lines 14 and 15 (which corresponds to the net power output), shall balance a portion of the potential delivered by the D. C. reference voltage element 24, at which point such follower is arrested and held. This follower drives the sliding contact 17 already referred to, to a position which thus corresponds to the net power output, such drive being effected by the connection 25. By this arrangement the third means is brought to such position that it delivers the potential representing the B. t. u./hr. corresponding to the net power output presently existing, but such B. t. u./hr. simulation is based on the ideal conditions instead of the presently existing conditions. The fifth means also effects certain other adjustments presently to be explained.

The seventh means is shown at 26. It is also conveniently a unit of the Moseley type, including the servo-motor element 27 which drives the follower 28 to a balance condition position. Said follower operates over the potentiometer element 29 which is connected across the lines 11 and 12 and therefore said potentiometer is subjected, between the points of connection of the lines 11 and 12 to it, to the potential which corresponds to the presently existing B. t. u./hr. for the net power output now being delivered. Usually that presently existing B. t. u./hr. will be greater than the B. t. u./hr under the ideal conditions, and accordingly, the sliding contact 30 which is moved by the follower 28 will usually travel between the points of connection of the lines 11 and 12 to such potentiometer 29. The sliding contact 17 of the third means connects by the line 20 to the seventh means, as shown, and the line 19 connects to the line 11, so that the servo-motor 27 will come to rest and be held with the sliding contact 30 at a position such that the portion of the potentiometer between the sliding contact 30 and the line 19 produces a potential between said sliding contact 30 and the line 19 equal to the potential being delivered by the third means. Thus the arresting and holding position of the sliding contact 30 and the follower 28 corresponds to the ratio of the B. t. u./hr. under the ideal conditions of operation compared to the B. t. u./hr. presently existing, both for the net power output now being delivered by the generating unit. Thus the follower 28 may be and is used to shift other elements, presently to be explained, to positions corresponding to that ratio. That ratio is the "correction factor" previously referred to.

The fourth means is shown at 32. This unit is so constructed that it can be caused to give an indication, in the form of a potential, preferably A. C., proportional to the incremental heat rate of the generating unit then delivering its output, which incremental heat rate corresponds to the output then being delivered by such generating unit, but which incremental heat rate is that determined under the ideal conditions. Those ideal conditions are either the determined incremental heat rate for such generating unit based on the specifications and designs, or on the acceptance or other tests as already explained. Thus, said fourth means, 32, delivers a potential proportional to the incremental heat rate of the generating unit in operation, based on the ideal conditions, and at the output being delivered by such unit. This so-determined incremental heat rate (potential) may then be subjected to the "correction factor" referred to in the previous paragraph, to determine the corresponding and true incremental heat rate of such generating unit, under presently existing conditions, and at the output now being delivered by such generating unit.

This fourth means includes at least one series-connected voltage-resistor section 33 corresponding to the generating unit for which correction of incremental heat rate is to be determined and applied to the ideal incremental heat rate for such generating unit. In Figure 1 we have shown three of these sections, designated as 33$^a$, 33$^b$ and 33$^c$, respectively. We shall presently explain the reason for providing and illustrating more than one such series-connected voltage-resistor section for the generating unit in question. Each of these sections includes a transformer 34 having its primary 35 supplied with a fixed A. C. potential *a*, and its secondary 36 tapped. (The elements of this unit are designated by corresponding identification numerals, but with the suffixes "*a*," "*b*" and "*c*," respectively, as shown.) Each of these sections also includes an adjustable resistor 37. The adjustable resistor and the tap of the secondary of each section are placed in series by the connections 38. The busbars or terminal lines 39 and 40 are provided, and the sliding contacts 41 of all of the adjustable resistors are connected to the line 40. The closed ends of the tapped secondaries of the transformers are connected to the line 39 with microswitches 42 included in such connections, so that any selected series-connected voltage-resistor may be connected to the line 39 by closing the proper microswitch.

Next we provide a source of A. C. of which the potential may be made proportional to the output now being delivered by the generating unit now in operation. Conveniently such a source comprises a transformer 43 provided with the primary 44 which is supplied with a fixed potential A. C. The secondary 45 of such transformer is tapped, and the sliding contact 46 may be moved to various tap positions so that the voltage delivered between the lines 47 and 48 may be adjusted to the tapped position value. This sliding contact 46 is connected to the follower element 23 of the servo-motor element 21 of the fifth means, so that such sliding contact is brought and retained at position corresponding to the output now being delivered by the generating unit. Such connection is effected by the line 49 in Figure 1. Thus the total potential between the lines 47 and 48 is proportional to the output now being delivered by the generating unit.

The current flowing in the circuit closed by the microswitch (one of the group $42^a$, $42^b$ and $42^c$), and which current flows through the corresponding series-connected voltage-resistor section $33^a$, $33^b$ or $33^c$ as the case may be, is to be brought to a value proportional to the output now being delivered by the generating unit. That current through such section flows between the lines 39 and 40. A fixed resistor of small value, 51, and comprising a shunt, is included in the line 39. The sixth means, 52, conveniently in the form of a Moseley unit of the type which has already been referred to, has one terminal connected to the line 39 at one end of the shunt 51, by the line 53, and its other terminal is connected by the line 54 to one end of the secondary 45 of the transformer 43. By this arrangement the drop across the shunt, produced proportionately to the current flowing through the line 39, and therefore through the series-connected voltage-resistor element selected by the microswitch, is balanced against the active portion of the secondary 45, or vice versa, so that the servo-motor of this sixth means is brought to rest and retained at position of the follower element 62 corresponding to the net output being delivered by the generating unit in question. The drive of the current through the circuit which includes the lines 39 and 40 and the selected series-connected voltage-resistor section, is produced by an adjustable source of A. C. This includes the transformer 58 whose primary 59 is fed a fixed potential A. C. The secondary 60 of this transformer is tapped. The closed end of this secondary is connected to the line 39. The sliding contact 61 of this tapped secondary is connected to the line 40. This sliding contact is connected to the follower 62 of the servo-motor of the sixth means. Thus, at the same time that the current flowing through the shunt 51 (and thus also through the series-connected voltage-resistor section) is brought to a value to simulate the output being delivered by the generating unit, the transformer 58 is caused to deliver to the circuit that amount of drive potential needed to produce such current value.

It is here noted that such potential (being the potential between the lines 39 and 40) is a measure of the incremental heat rate then existing for the generating unit then in operation, and at the load then being carried by such unit.

As stated in the earlier portion of this specification, the incremental fuel input vs. power output curve is normally either a straight line or slightly concave upward, with a positive intercept at zero power output; and that frequently the curve will have one or more points of discontinuity depending on the type of governing employed. We have also pointed out that the incremental fuel cost (and incremental heat rate) vs. power output curve may be represented by a series of straight line segments, each of suitable slope and intercept. It is here noted that this latter form of delineating the curve may be used even when the curve is non-straight, since such a curve may be closely approximated by a series of consecutive short straight lines of successively steeper slopes as the output increases. Therefore to delineate the close approximation of the curve, whether a true curve or a straight line, or a series of straight lines or curves which are non-continuous and are connected by points of discontinuity, use may be made of groups of series-connected voltage-resistor sections such as illustrated in Figure 1 at $33^a$, $33^b$ and $33^c$. The voltage element 34 of each section is then adjusted to deliver a voltage to simulate the positive (or negative) value of the intercept at the zero position; and the resistance element 37 of such section has its contact 41 set to position such that the variation of drop (potential) over such section, with variation of current (power simulation) produces a slope corresponding to the slope of the incremental rate line being simulated by such section "33." When several of these sections are needed or provided to simulate successive portions of the incremental rate curve such sections 33 may be brought successively into circuit in the unit 32 (fourth means), by closing the proper microswitches in turn, opening the non-used microswitches so that only one section 33 will be in use at a time.

In Figure 1 we have indicated, by the lines 63, 64, 65 and 66 driving connections from the servo-motor of the unit 21, or from a power output control element actuated by the output of the generating unit, whereby as the generator output changes so that a different section of the incremental rate curve is to be simulated, the previous microswitch will be cut out of service and the proper one will be brought into service to connect the proper section 33 across the lines 39 and 40. By this means the fourth means is made to give its simulations over whatever power output range is needed for the generating unit in question.

Next we consider the eighth means previously defined. This unit serves to apply the "correction" factor to the incremental heat rate value as determined by the fourth means just described. That correction factor is determined and indicated by the follower 28 of the seventh means already described. We provide a transformer 67 having a tapped primary 68, and a secondary 69. One end of the primary is connected to the line 40, and the line 39 connects to the movable contact 70 which engages the taps of the primary. This movable contact 70 is driven to position corresponding to the position of the follower 28, by the connection 71, so that the ratio of transformation between the primary and secondary of such transformer is brought to equality with the value of the "correction" factor. Accordingly, the potential delivered by the secondary 69 to the lines 72 and 73 is equal to the incremental heat rate indicated by the fourth means, corrected to presently existing conditions by the value of the correction factor.

It is now noted that the incremental heat rate thus delivered and simulated by the potential between the lines 72 and 73 is in B. t. u./hr. If it be desired to automatically produce and deliver an indication of that incremental rate in terms of incremental fuel cost, use may be made of the unit ninth means, shown in Figure 1, and previously defined herein. This unit comprises the transformer 74 having its primary 75 connected across the lines 72 and 73 so that said primary is subjected to a potential which simulates the corrected incremental heat rate on the basis of presently existing conditions. One end of the secondary 76 of this transformer is connected to a line 77, and the secondary is tapped. The slidable contact 78 which engages such taps is then connected to the line 79. Thus the potential delivered between the lines 77 and 79 is the incremental heat rate under presently existing conditions, corrected by a factor which is the transforming ratio of the transformer 74. That ratio may be adjusted to simulate the cost of the heat in dollars or other units, so that the potential delivered between the lines 77 and 79 is a simulation of the incremental cost rate under presently existing conditions, and at the power output now being delivered.

In Figure 1 we have shown schematically at 80 an indicating meter which shows by the position of its pointer 81, in comparison to the scale 82, the incremental cost rate under presently existing conditions, and at the output now being delivered. We have also indicated, adjacent to this meter the unit 83. This is a suitable form of integrating circuit unit of such characteristics that the indication given by the pointer 81 is the average cost rate for a predetermined interval of time, such as the last minute or the last five minutes of the operation. We do not deem it necessary to show in detail the form or elements of such circuit unit as the same may be of a presently known conventional type capable of producing and delivering to the pointer actuating elements, a signal which shall be of value proportional to the average of the quantity integrated over the interval of time.

In the foregoing disclosures we have included all of the elements and functions needed to determine and indicate the actual incremental cost of power delivered by the generating unit in question under present operating conditions and at the power output now being delivered. Specifically these elements of means include the means to determine the heat rate per kw./hr. under ideal conditions, and means to determine the ratio of ideal heat rate to present heat rate. This is true as shown below:

The unit "fifth means," V, a gives an indication of the present output of the generator for which purpose its follower 23 may move a pointer 84 in comparison to a scale 85. Said scale may be graduated to show heat rate per kw./hr. under the ideal conditions, and said scale will in such case have its marking properly spaced and designated to show and indicate the heat rate per kw./hr. Thus this instrument will provide, by its direct indication, the heat rate per kw./hr. at the output now being delivered by the generating unit in question.

The unit "seventh means," VII, gives an indication of the ratio of ideal heat rate vs. present heat rate. For this purpose the follower 28 may move a pointer 86 in comparison to a scale 87. Said scale may be graduated to show ratio of ideal heat rate to present heat rate, and said scale will have its markings properly spaced and designated to show such ratio.

By dividing the reading shown by the pointer 84 on the scale 85 by the reading shown by the pointer 86 on the scale 87 the heat rate per kw./hr. under present operating conditions is obtained. Thus (4) Heat rate per kw./hr. (present) equals heat rate per kw./hr. (ideal)/ratio of ideal heat rate to present heat rate.

By applying the present cost of fuel per B. t. u. to the heat rate per kw./hr. obtained by Equation 4, we may immediately obtain the present cost rate per kw./hr. in dollars. It is frequently desirable to determine the amount of this cost rate under present operating conditions and present cost of fuel per B. t. u. As shown above, the present disclosures provide the means to obtain this important information very quickly, and by a simple arithmetical operation from readings of the two instruments of the fifth means and the seventh means. This feature and objective constitute an important portion of our present invention.

Figure 2:
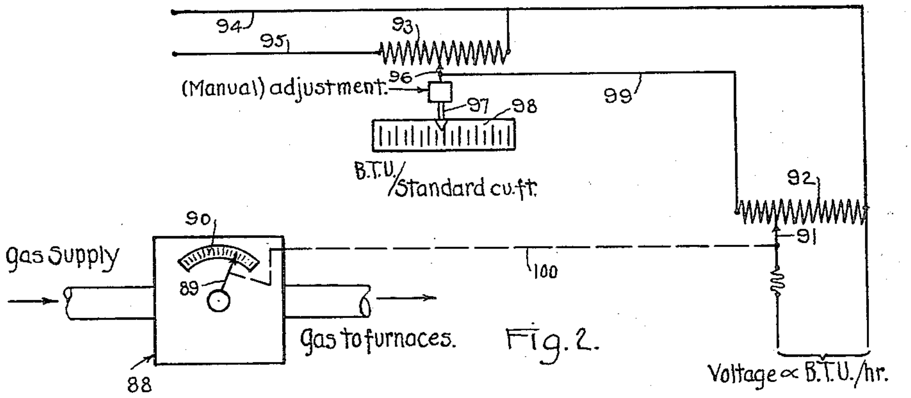
Figure 2 shows schematically a gas metering arrangement complying with the requirements for such a metering unit as previously disclosed herein.

In Figure 2 we have shown schematically a form of fuel metering arrangement to give an indication of the B. t. u./hr. input of heat when the fuel is gas. In this figure we have shown a gas metering device 88 such as a Linderman type meter, having the pointer 89 movable over the scale 90 proportionately to gas flow rate and according to cubic feet of gas per unit time corrected to atmospheric pressure of known value (such as sea-level pressure), and at predetermined temperature (such as 60 degrees F.). The pointer 89 shifts the movable contact 91 of a potentiometer 92 to position to include a fraction of the whole resistor proportional to the rate of gas flow. We also provide a potentiometer 93 supplied with a fixed potential from the lines 94 and 95. The movable contact 96 of this potentiometer may be manually adjusted to position to correspond to heat content of the gas in B. t. u. per standard cubic foot, as shown by the pointer 97 in comparison to the scale 98. The line 94 (being one end of the potentiometer 93) connects to one end of the potentiometer 92, and the movable contact 96 of the potentiometer 93 connects by the line 99 to the free end of the potentiometer 92. Under this arrangement the potential between the line 94 and the movable contact 91 will be proportional to the B. t. u./hr. gas fuel consumption. The pointer 89 is shown as connected to the movable contact 91 by the connection 100.

Figures 3, 4:
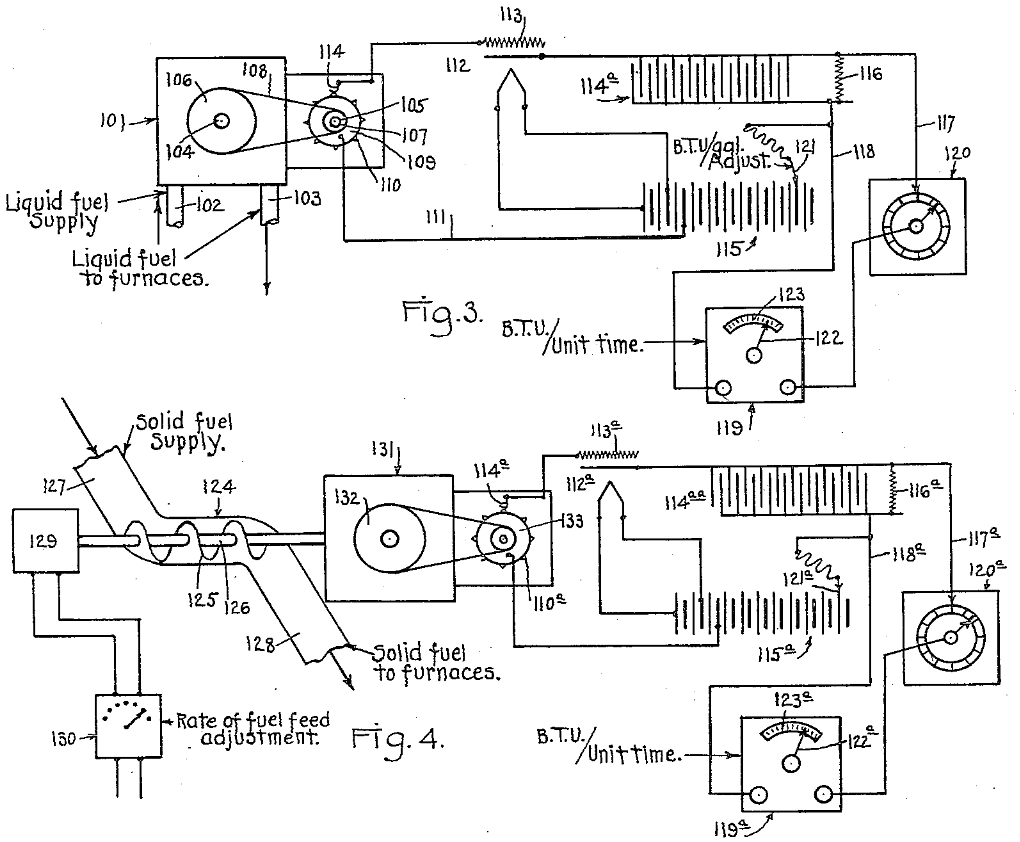
Figure 3 shows schematically a liquid metering arrangement complying with the requirements for such a metering unit as previously disclosed herein.
Figure 4 shows schematically a powdered coal metering arrangement complying with the requirements for such a metering unit as previously disclosed herein.

In the arrangement shown schematically in Figure 3 provision is made for determining and giving an indication of B. t. u./hr. when the fuel is a liquid such as fuel oil. In this case the fuel meter is shown at 101 with the inlet and outlet connections at 102 and 103, respectively. As an example of such a liquid meter we may mention the Connersville type of meter. This instrument is provided with a shaft 104 which rotates proportionately to volume of liquid passing through the meter; but usually the rate of shaft rotation is rather low. Accordingly, in Figure 3 we have shown the speed increasing connection from the shaft 104 to another shaft 105, comprising the wheel 106 carried by the shaft 104 and driving a smaller pulley 107 carried by the shaft 105 to drive the same at increased speed, by the chain connection 108. The shaft 105 carries a disk 109 having a number of contact points 110, the disk being connected to the line 111 of an electrical circuit. The three electrode tube 112 has its grid 113 connected to the brush 114 which is engaged by the contacts 110 as the disk rotates. The tube 112 is normally biased for cut-off but each time the grid is electrified by engagement of one of the contacts 110 with the brush 114 the tube is made conducting for a short interval.

A condenser 114$^a$ is connected to a fixed D. C. potential such as the battery 115, under control of the tube 112 so that each time the grid is electrified by one of the contacts 110 a charge is added to the condenser. A bleeder resistor 116 is connected across this condenser so that leakage constantly occurs. The lines 117 and 118, connected to the condenser, are brought to the voltmeter 119 under control of the timing device such as a clock 120, provided with means to establish the circuit to the voltmeter at equally timed intervals, such as each minute. These circuit closings would be for short intervals, long enough to give correct voltage readings, but not long enough to materially affect the calibration of the system, on the basis of the leakage through the bleeder resistor 116.

The voltage delivered by the battery 115 is made adjustable by shift of the connection 121 from the line 118 to the proper potential point of the battery. By adjusting the potential delivered by the battery to a value proportional to the B. t. u. per gallon of the metered fuel, the average condenser potential, shown by the meter 119 becomes proportional to the B. t. u./min. of the fuel flow. Conveniently, the meter 119 has its pointer 122 read in connection with the scale 123, which scale may then be calibrated to read directly in B. t. u./min. or other B. t. u. rate readings.

In the arrangement shown schematically in Figure 4 provision is made for determining and giving an indication of B. t. u./hr. when the fuel is powdered coal or other fine material of solid nature. This arrangement is similar to that shown in Figure 3 for the case of liquid fuel, and accordingly we have identified various of the elements shown in Figure 4 by the same numerals as have been used in connection with Figure 3, but using the suffix "*a*." In the present case however, the powdered fuel is fed through the metering tube 124 by an impeller 125 carried by the shaft 126, the fuel entering the tube through the connection 127 and being delivered to the furnace through the connection 128. The shaft 126 may be driven by the motor 129 at speed controlled by the controller 130 by which the rate of fuel delivery is controlled.

Connected to the shaft 126 is the transmission unit 131 having the drive member 132 which drives the member 133 at increased speed through the chain and sprocket drive shown in the figure, or other convenient form of drive at fixed ratio of speeds. The member 133 carries the contacts 110ᵃ which engage the brush 114ᵃ to deliver the short impulses in manner and for purposes and functions similar to those already explained in connection with the showing of Figure 3. It is not believed necessary to repeat those functions and purposes in detail here; but it is noted that the reading of the scale 123ᵃ at the location of the pointer 122ᵃ would be in B. t. u./min. or other B. t. u. rate values, depending on the potential delivered to the line 118ᵃ and according to the setting of the adjustable connection 121ᵃ to the source of D. C., such as the battery 115ᵃ.

It is noted that the generating unit is heat energy driven. For example, the prime mover may be steam driven, and either turbine or reciprocating type, or other; or such prime mover may be of the internal combustion type, either two or four cycle, either diesel or other. In any case we have disclosed means to determine the heat rate input to such prime mover, and have made other provisions for determination of the present incremental heat rate at presently existing power output of the heat energy driven generating unit; and have also disclosed herein and have provided the means to compare the present heat rate with the ideal heat rate and to determine the ratio between said heat rates, and give an indication of such ratio.

We claim:

1. Means to determine the present incremental heat rate of a heat energy driven generating unit at presently existing net power output of said generating unit, comprising means to determine the present rate of heat energy supply to said unit and including rate of heat energy supply indicating means responsive to the present rate of heat energy supply, means to determine the present net power output of said generating unit and including net power output indicating means responsive to the present net power output of said generating unit to give an indication proportional to the present net power output, means to determine power output values corresponding to present net power output values under predetermined operating conditions of said generating unit and including means to give indications which are proportional to present net power output values under said predetermined operating conditions, operative connections between the aforementioned net power output response indicating means and the last mentioned determining means effective to cause the indication giving means of said last mentioned determining means to give an indication which corresponds to present net power output, means to determine the rate of heat energy supplied to said generating unit at the present net power output and under predetermined operating conditions of said generating unit, including means to give an indication of said rate of heat energy supplied to said generating unit at the present net power output and under said predetermined operating conditions, operative connections between the means which gives indications which are proportional to present net power output values under the said predetermined operating conditions, and the last mentioned means to determine the rate of heat energy supplied to the generating unit, effective to cause the indication giving means last mentioned to indicate proportionately to present net power output under said predetermined operating conditions, all said means including, means to determine and give an indication corresponding to the ratio of said indicated present rate of heat energy supply to said generating unit compared to said indicated rate of heat energy supply to said generating unit under said predetermined operating conditions of said generating unit, means to give an indication of the incremental heat rate of said generating unit under said predetermined operating conditions of said generating unit and at the present net power output, said incremental heat rate indicating means including at least one current carrying impedance unit, means to deliver current through said impedance unit and to vary said current, operative connections between the net power output indicating means which gives an indication proportional to the present net power output, and the means which delivers and varies current through the impedance unit, effective to produce a current value through said impedance unit which is proportional to the value of the net power output, to produce a potential across said impedance unit corresponding to the present incremental heat rate of the generating unit, means to produce a second potential proportional to the first mentioned potential, means to vary the ratio between both of said potentials, and operative connections between the ratio determining and indicating means aforesaid, and the means which varies the ratio between the potentials, effective to cause the ratio between the potential to vary proportionately to the indication of the ratio between the present heat rate of heat energy supply and the rate of heat energy supply under the predetermined operating conditions of the generating unit.

2. Means as defined in claim 1, together with means to multiply the value of said second potential by a factor which is proportional to the present unit cost of the heat energy supplied to said generating unit.

3. Means as defined in claim 2, wherein said multiplying means includes means which is adjustable to selected values of said factor corresponding to selected unit costs of the heat energy supplied to said generating unit.

4. Means as defined in claim 1, wherein the heat energy supplied to said generating unit comprises solid fuel, and wherein the means to determine the present rate of heat energy supply to said generating unit includes means to determine and give an indication of the rate of supply of said solid fuel to said generating unit, means to give an indication of a factor value corresponding to the net heat energy produced by said solid fuel per unit of such fuel under present operating conditions, and wherein the means to determine and give the indication of the present rate of heat energy supply to said generating unit includes means to multiply said indication of the rate of supply of said solid fuel to said generating unit multiplied by the indication which corresponds to the value of said factor.

5. Means as defined in claim 1, wherein the heat energy supplied to said generating unit comprises liquid fuel, and wherein the means to determine the present rate of heat energy supply to said generating unit includes means to determine and give an indication of the rate of supply of said liquid fuel to said generating unit, means to give an indication of a factor value corresponding to the net heat energy produced by said liquid fuel per unit of such fuel under present operating conditions, and wherein the means to determine and give the indication of the present rate of heat energy supply to said generating unit includes means to multiply said indication of the rate of supply of said liquid fuel to said generating unit multiplied by the indication which corresponds to the value of said factor.

6. Means as defined in claim 1, wherein the heat energy supplied to said generating unit comprises gaseous fuel, and wherein the means to determine the present rate of heat energy supply to said generating unit includes means to determine and give an indication of the quantity rate of supply of said gaseous fuel to said generating unit, means to give an indication of a factor value corresponding to the net heat energy produced by said gaseous fuel per unit of such fuel under present operating conditions, and wherein the means to determine and given an indication of the present rate of heat energy supply to said generating unit includes means to multiply said indication of the quantity rate of supply of said gaseous fuel to said generating unit multiplied by the indication which corresponds to the value of said factor.

7. Means to determine and give an indication of the ratio of the present heat rate of a heat energy driven generating unit at present power output in comparison to the heat rate of said generating unit under predetermined operating conditions and at present power output, comprising means to determine the present rate of heat energy supply to said unit and including rate of heat energy supply indicating means responsive to the present rate of heat energy supply, means to determine the present net power output of said generating unit and including net power output indicating means responsive to the present net power output of said generating unit to give an indication proportional to the present net power output, means to determine power output values corresponding to present net power output values under predetermined operating conditions of said generating unit and including means to give indications which are proportional to present net power output values under said predetermined operating conditions, operative connections between the aforementioned net power output response indicating means and the last mentioned determining means effective to cause the indication giving means of said last mentioned determining means to give an indication which corresponds to present net power output, means to determine the rate of heat energy supplied to said generating unit at present net power output and under predetermined operating conditions of said generating unit including means to give an indication of said rate of heat energy supplied to said generating unit at the present net power output and under said predetermined operating conditions, operative connections between the means which gives indications which are proportional to present net power output values under the said predetermined operating conditions, and the last mentioned means to determine the rate of heat energy supplied to the generating unit, effective to cause the indication giving means last mentioned to indicate proportionately to present net power output under said predetermined operating conditions, all said means including, means to determine and give an indication corresponding to the ratio of said indicated present rate of heat energy supply to said generating unit at present power output compared to said indicated rate of heat energy supply to said generating unit under said predetermined operating conditions of said generating unit and at present power output.

8. Means as defined in claim 7, wherein said means to determine and give an indication of the net power output of said generating unit includes means to give an indication of the heat rate per unit of power per hour under said predetermined operating conditions.

9. Means as defined in claim 7, wherein the heat energy supplied to said generating unit comprises solid fuel, and wherein the means to determine and give the indication of the present rate of heat energy supply to said generating unit includes means to determine and give an indication of the rate of supply of said solid fuel to said generating unit, means to give an indication of a factor value corresponding to the net heat energy produced by said solid fuel per unit of such fuel under present operating conditions, and wherein the means to determine and give the indication of the present rate of heat energy supply to said generating unit includes means to multiply said indication of the rate of supply of said solid fuel to said generating unit multiplied by the indication which corresponds to the value of said factor.

10. Means as defined in claim 7, wherein the heat energy supplied to said generating unit comprises liquid fuel, and wherein the means to determine and give the indication of the present rate of heat energy supply to said generating unit includes means to determine and give an indication of the rate of supply of said liquid fuel to said generating unit, means to give an indication of a factor value corresponding to the net heat energy produced by said liquid fuel per unit of such fuel under present operating conditions, and wherein the means to determine and give the indication of the present rate of heat energy supply to said generating unit includes means to multiply said indication of the rate of supply of said liquid fuel to said generating unit multiplied by the indication which corresponds to the value of said factor.

11. Means as defined in claim 7, wherein the heat energy supplied to said generating unit comprises gaseous fuel, and wherein the means to determine and give the indication of the present rate of heat energy supply to said generating unit includes means to determine and give an indication of the quantity rate of supply of said gaseous fuel to said generating unit, means to give an indication of a factor value corresponding to the net heat energy produced by said gaseous fuel per unit of such fuel under present operating conditions, and wherein the means to determine and give an indication of the present rate of heat energy supply to said generating unit includes means to multiply said indication of the quantity rate of supply of said gaseous fuel to said generating unit multiplied by the indication which corresponds to the value of said factor.

12. Means to determine the present incremental heat rate of a heat energy driven generating unit at presently existing net power output of said generating unit, comprising means to determine the present rate of heat energy supply to said unit, indicating means responsive to said determining means, means to determine the net power output of said generating unit, indicating means responsive to said determining means, means intermediate between the present rate of heat energy supply determining means and the net power output determining means, including means to determine a corrected value of rate of heat energy supply corresponding to present power output values under predetermined operating conditions for a selected range of net power output values, indicating means responsive to such corrected value of heat energy supply determining means, operative connections between the corrected value of the rate of heat energy supply determining means and the net power output indicating means, and between the corrected value of rate of heat energy supply determining means and the present rate of heat energy supply indicating means operative to cause the indicating means of the corrected value determining means to give a response indication corresponding to rate of heat energy supply for present net power output under said predetermined operating conditions, means to determine the ratio of the present rate of heat energy supply to said generating unit compared to the rate of heat energy supply to said generating unit under said predetermined operating conditions, indicating means responsive to said determining means, operative connections between said ratio determining means and said corrected value rate of heat energy supply indicating means and between said ratio determining means and said present rate of heat energy supply indicating means effective to cause the indicating means of said ratio determining means to give an indication corresponding to said ratio, means to determine the incremental heat rate of said generating unit under said predetermined operating conditions of said generating unit and at the present net power output, means to give an indication of said incremental heat rate, operative connections between said incremental heat rate determining means and the net power output indicating means effective to cause the incremental heat rate indicating means to give an indication of incremental heat rate at present net power output under said predetermined operating conditions, ratio applying means including input value elements to receive an input value and output value elements to deliver an output value, and means to produce a selected ratio between the input value applied to the input value elements and the output value delivered at the output value elements, connections between the incremental heat rate indicating means and the input value elements of said ratio applying means, and connections between the ratio indicating means of the ratio determining means first mentioned, and the means which produces a selected ratio between the input value and the output value of the ratio applying means second mentioned, effective to cause the output value delivered by the output value elements to correspond to the incremental heat rate of said generating unit at present net power output and under present operating conditions.

13. Means as defined in claim 12, together with unit cost applying means to produce a second output value which is proportional to unit costs of the heat units of said incremental rate output value, comprising a variable ratio unit having input value elements and output unit cost value elements, and including means to produce output unit cost values proportional to the input values, and means to vary the ratio of the proportion produced by said variable ratio unit, together with operative connections between the output value elements of the means which produces a selected ratio above defined and the input value elements of the unit cost applying means.

14. Means as defined in claim 12, wherein the means to give an indication of said incremental heat rate is electrical, and wherein the indication of incremental heat rate at present net power output under said predetermined operating conditions comprises a potential of which the value is proportional to the value of said incremental heat rate.

15. Means as defined in claim 14, wherein the ratio applying means is electrical and is provided with electrical input value terminals and with electrical output value terminals, and wherein the means to produce a selected ratio between the input value and the output value comprises means to vary the voltage ratio between the input value terminals and the output value terminals.

16. Means as defined in claim 15, together with unit cost applying means to produce a second output value which is proportional to unit costs of the heat units of said incremental rate output value, comprising a variable ratio unit having input value elements and output unit cost value elements, and including means to produce output unit cost values proportional to the input values, and means to vary the ratio of the proportion produced by said variable ratio unit, together with operative connections between the output value elements of the means which produces a selected ratio above defined and the input value elements of the unit cost applying means.

17. Means as defined in claim 16, wherein the unit cost applying means is electrical and is provided with electrical input value terminals and with electrical output value terminals, and wherein the cost applying means includes means to produce a potential between the output value terminals proportional to the potential across the input value terminals, and wherein the ratio between the potential across the input terminals compared to the potential between the output terminals is variable to correspond to selected unit costs of the heat units.

References Cited in the file of this patent

UNITED STATES PATENTS

| | | |
|---|---|---|
| 2,301,470 | Starr | Nov. 10, 1942 |
| 2,454,520 | Moore | Nov. 23, 1948 |
| 2,523,453 | Starr | Sept. 26, 1950 |
| 2,613,237 | Starr | Oct. 7, 1952 |
| 2,656,977 | Cummings | Oct. 27, 1953 |

OTHER REFERENCES

"Co-ordination of fuel cost and transmission loss by use of the network analyzer to determine plant loading schedules" (George, Page, and Ward) AIEE technical paper 49-242, September 1949.